(12) United States Patent
Hryckowian

(10) Patent No.: US 10,518,988 B1
(45) Date of Patent: Dec. 31, 2019

(54) SAFETY MECHANISM FOR USE WITH A DRUM UNLOADER

(71) Applicant: Integrated Dispense Solutions, Shelby Township, MI (US)

(72) Inventor: Andy Hryckowian, Washington, MI (US)

(73) Assignee: Integrated Dispense Solutions, Shelby Township, MI (US)

( * ) Notice: Subject to any disclaimer, the term of this patent is extended or adjusted under 35 U.S.C. 154(b) by 0 days.

(21) Appl. No.: 16/113,148

(22) Filed: Aug. 27, 2018

(51) Int. Cl.
*B65G 65/00* (2006.01)

(52) U.S. Cl.
CPC ................... *B65G 65/005* (2013.01)

(58) Field of Classification Search
CPC .......... B65G 65/005; B67D 7/02; B67D 7/62; B65D 83/0044; F15B 11/08; F15B 13/042
USPC ... 222/320, 146, 5, 259–263, 386–389, 405, 222/319, 252; 219/230, 426, 540, 542
See application file for complete search history.

(56) References Cited

U.S. PATENT DOCUMENTS

| | | | | |
|---|---|---|---|---|
| 4,355,734 A * | 10/1982 | Moore | ................ | B05C 21/00 137/341 |
| 4,389,001 A * | 6/1983 | Franklin | ................ | B29B 13/022 222/261 |
| 10,239,681 B2 * | 3/2019 | Thompson | ............ | F15B 13/042 |
| 2007/0039978 A1 | 2/2007 | Scheugenpflug | | |

OTHER PUBLICATIONS

Graco, Inc., Minneapolis, MN, USA, Instruction and User Manual for Therm-O-Flow 200, EasyKey Hot Melt Drum Unloaders, for applying hot melt sealant and adhesive materials, 311208S EN, Revision S, Jul. 2017, 98 pages.
Focke Meler Gluing Solutions, S.A., Navarra, Spain, Instructions Manual for Adhesive Melter PS200 Drum Unloader, MA-5066-E 080816, Edition Aug. 2016, 92 pages.
Wilden Pump & Engineering, LLC, Instruction Manual for Drum Unloader System, EOM Engineering Operation & Maintenance, Saniflo Series, WIL-12070-E-03, 26 pages.

* cited by examiner

*Primary Examiner* — Lien M Ngo
(74) *Attorney, Agent, or Firm* — Brinks Gilson & Lione

(57) ABSTRACT

An apparatus for forcing a viscous material to flow from a storage container. This apparatus having a follower plate configured to be inserted into an open-end of the storage container; a sealing element located around the outer periphery of the follower plate; a pump assembly that includes a pump, an air motor, and a pipe in fluid communication with the follower plate; a support stand comprising a base, a crossbar; and two or more cylinders and rods; one or more control systems; and a safety mechanism configured to reversibly allow or prevent the air pressure from being supplied to the air motor depending upon the position of the follower plate either outside or inside the storage container. The sealing element is configured to provide a leak-proof seal with the storage container when the follower plate is located inside the storage container.

17 Claims, 4 Drawing Sheets

SAFETY MECHANISM FOR USE WITH A DRUM UNLOADER

FIELD

This disclosure relates generally to a safety mechanism and to an apparatus, such as a drum unloader, that incorporates the safety mechanism and is capable of forcing a viscous material to flow from a storage container.

BACKGROUND

The statements in this section merely provide background information related to the present disclosure and may not constitute prior art.

A variety of industries incorporate a follower plate into an apparatus, i.e., a drum unloader, that is configured to evacuate a viscous material, such as a hot melt adhesive and the like from a drum or other storage container. The follower plate generally includes a surface and a central aperture. The surface of the follower plate forces the melted adhesive to flow through the central aperture into the inlet of a pump, which moves the adhesive to other fluid handling equipment near the point of its application onto the surface of a substrate.

One potential problem with this type of apparatus is the number of operator injuries that occur if the follower plate is allowed to move downward when the follower plate is located outside the confines of the storage container. Other potential problems may also occur when using this type of apparatus. These other potential problems include: (i) over-pressurization of the storage container, which results in the container either becoming deformed and/or ruptured; (ii) the generation of material waste caused by leaving residual material in the storage material and/or the dripping of viscous material from the follower plate when it is external to the container during replacement of an empty container with a full storage container; and (iii) the occurrence of an injury to the operator if he/she comes into physical contact with the hot viscous material.

SUMMARY

The present disclosure generally provides an apparatus for forcing a viscous material to flow from a storage container. This apparatus generally comprises a follower plate configured to be inserted into an open-end of the storage container; a sealing element located around the outer periphery of the follower plate; a pump assembly that includes a pump, an air motor, and a pipe or tube that is in fluid communication with the follower plate; a support stand comprising a base, a crossbar; and two or more cylinders with rods inserted therein; one or more control systems; and a safety mechanism configured to reversibly allow or prevent the air pressure from being supplied to the air motor depending upon the position of the follower plate. The follower plate may be located in a position that is either outside or inside the storage container. The sealing element is configured to provide a leak-proof seal with the storage container when the follower plate is located inside the storage container. The air motor is supplied with a source of air pressure and the cylinders and rods are configured to move the follower plate up or down based on air pressure supplied thereto.

According to another aspect of the present disclosure, the safety mechanism used in the apparatus comprises a first valve configured to reversibly switch between on and off in order to allow or prevent air pressure from flowing from a source to the air motor-driven pump assembly; at least one device configured to measure the position of the follower plate relative to the storage container; and a second valve that is in communication with the first valve and the device. The second valve is configured to instruct the first valve to prevent air pressure from being supplied to the air motor-driven pump assembly when the follower plate is external to the storage container. The second valve is further configured to instruct the first valve to allow air pressure from the source to be supplied to the air motor-driven pump assembly when the follower plate is within the storage container.

According to another aspect of the present disclosure a method of removing the viscous material from a storage container is provided. This method generally comprises the steps of:

a) providing a source of air pressure;
    b) providing an apparatus as described above and further defined herein that is configured to force the viscous material to flow from the storage container;
    c) providing a storage container of viscous material;
    d) positioning the follower plate inside the open-end of the storage container;
    e) allowing air pressure to flow from the source to the air motor-driven pump assembly; and
    f) causing a pump to evacuate the viscous material from the storage container by flowing through the pump assembly.

The method may further comprise the steps of:

g) stopping the downward movement of the follower plate when the follower plate approaches the bottom of the storage container; the storage container now becoming an empty container;
    h) moving the follower plate in an upward direction until it reaches a position that is above the open-end of the empty container;
    i) allowing the safety mechanism to prevent air pressure from being supplied from the source to the air motor-driven pump assembly;
    j) removing the empty container;
    k) providing another storage container of viscous material; and
    l) repeating steps d), e), and f).

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
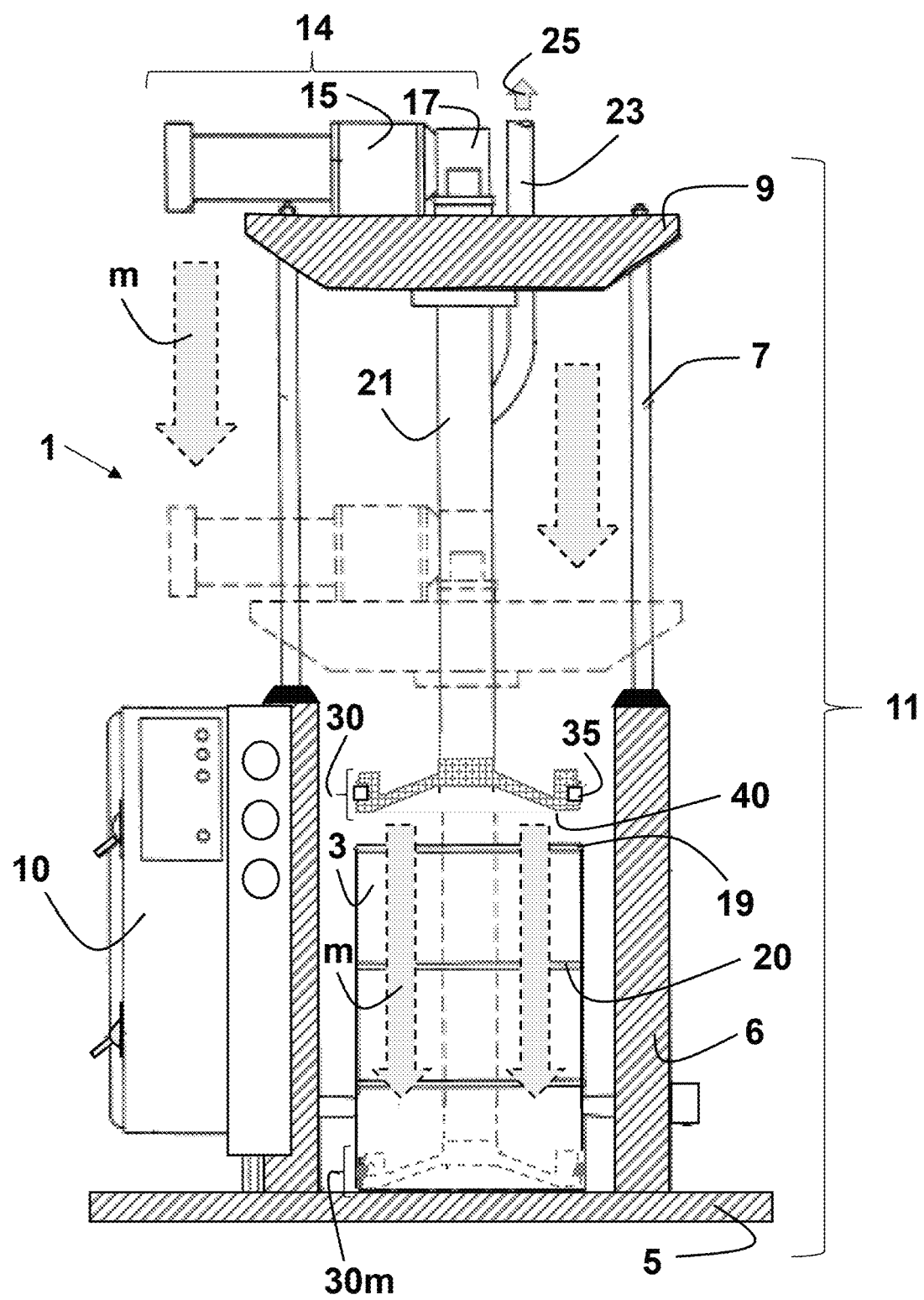
FIG. 1 is a schematic representation of a drum unloading apparatus that forces a viscous material to be removed from a storage container according to the teachings of the present disclosure.

The drawings described herein are for illustration purposes only and are not intended to limit the scope of the present disclosure in any way.

DETAILED DESCRIPTION

The present disclosure generally provides a safety mechanism for use in an apparatus, such as a drum unloader, that forces a viscous material to flow from a storage container is provided. This safety mechanism prevents air pressure from being supplied to the air motor-driven pump assembly when the follower plate is not located within the storage container. Thus, this safety mechanism reduces the potential of operator injuries that may occur from a pinch point that exists at the inlet of the pump assembly due to the inlet being accessible to contact with an operator when it is not within the storage container.

The following description is merely exemplary in nature and is in no way intended to limit the present disclosure or its application or uses. For example, the safety mechanism made and used according to the teachings contained herein is described throughout the present disclosure in conjunction with an apparatus that dispenses a hot melt adhesive in order to more fully illustrate the composition and the use thereof. The incorporation and use of such a safety mechanism in an apparatus that dispenses other viscous materials, such as other adhesives, sealants, syrups, gels, pastes, mastics, gums, or the like from a storage container is contemplated to be within the scope of the present disclosure. It should be understood that throughout the description, corresponding reference numerals indicate like or corresponding parts and features.

Referring to FIG. 1, an apparatus 1 configured to force a viscous material 3 from a bulk storage container 20 is provided. This apparatus 1, generally, comprises a follower plate 30 as described above and further defined herein, a pump assembly 14 that includes an air motor 15 a pump 17, and a pipe 21 or tube that is in fluid communication with the follower plate 30; at least one control system 10; and a support stand 11 that includes a base 5, two or more upright cylinders 6 and rods 7 associated therewith, and one or more support crossbars 9. The cylinders 6 and rods 7 are configured to move the follower plate 30 up or down based on air pressure supplied thereto. When desirable, the base 5 may be designed such that it provides support for the bulk storage container 20. One skilled in the art will understood that additional support members connected between cylinders 6 and base 5 may be used when necessary or desirable.

The pump assembly 14 includes an air-operated motor 15 driven pump 17 supplied with air from a pressurized source, as well as a pipe 21 or tube that is in fluid communication with the follower plate 30. The pump 17 is generally a positive displacement type pump, including but not limited to, a piston pump, a gear or rotary lobe pump, a rotary vane pump, or a diaphragm pump.

The control system 10 integrated with the apparatus 1 may comprise one or more conventional or available controllers. At least one of the control systems 10 includes a pneumatic control system as further described in FIGS. 2-3 and as further defined herein. The pneumatic control system includes a safety mechanism that is configured to reversibly allow or prevent the air pressure from being supplied to the air motor 15 depending upon the position of the follower plate 30. The control system 10 may also be configured to measure and/or control one or more physical system parameters, including without limitation, pressure, temperature, material flow rate, rate of compression, etc. Alternatively, the control system 10 is configured to control a plurality of the physical system parameters.

Still referring to FIG. 1, the follower plate 30 is configured to fit into an open-end 19 of a bulk storage container 20. Depending upon the state of the operation at any given time, the follower plate 30 may be located either outside or inside the storage container 20. This storage container 20 may be constructed of a material capable of withstanding the forces generated during the removal of the viscous material 3 stored therein. The overall size of the storage container 20 may include any size and geometry that is commonly used or desirable for the storage of a viscous material 3. The container may range in volume, without limitation from about 20 liters (5 gallons) to about 200 liters (55 gallons). For example, the storage container 20 may comprise, but not be limited to, a 200-liter (55-gallon) drum, a 20-liter (5-gallon) pail, a 5-liter (1-gallon) can, or the like. The inner peripheral surface of the storage container is configured to interact with the follower plate 30 through a sealing element 35 in order to provide a leak-proof seal.

The sealing element 35 is located around the outer periphery of the follower plate 30 and during operation comes into contact with the inner peripheral surface of the storage container 20. This sealing element 35 creates a leak-proof seal with the storage container when the follower plate 30 is located inside the storage container 20. The storage container is not typically filled to capacity because the sealing element 35 must make contact with the container in order to form a proper seal prior to removal of the viscous material from the container 20. By positioning the sealing element 35 around the outer periphery 32o of the follower plate 30, the amount of unfilled space at the top of the storage container 20 can be minimized.

For the purpose of this disclosure, a viscous material 3 may be defined as a material that exhibits a viscosity of 30,000 millipascal-seconds (centipoise) or greater. Alternatively, the viscosity of the viscous material may range from about 30,000 millipascal-seconds (centipoise) up to about 2,000,000 millipascal-seconds (centipoise).

The follower plate 30 of the apparatus 1 is in fluid communication with one end of a pipe or tube 21 and aligned with an open end 19 of the storage container 20. During operation, the follower plate 30 is moved downward into the storage container 20, thereby forcing the viscous material 3 to flow through the pipe or tube 21 and pump 17 associated therewith. In FIG. 1, the follower plate 30 is shown in a raised or elevated position prior to being inserted into the storage container 20. In this state, pressurized air is supplied to the support cylinders 6 in order to cause the cylinder rods 7 to extend from the support cylinders 6 such that the crossbar 9 and associated pump assembly 10 supported thereon are raised to an elevated position. When the follower plate 30 is inserted into the open end 19 of the storage container 20, pressurized air may be applied to the support cylinders 6 to cause the cylinder rods 7 to retract, and in turn cause the crossbar 9 to move in a downward direction. This movement (m) is depicted in FIG. 1 through the use of dotted lines. In this state, the follower plate 30 applies a force or pressure against the viscous material 3 in the storage container 20.

The air pressure supplied from an air pressure source, such as the plant air supply, is generally pressured to about 20 psi or greater; alternatively, 30 psi or more; alternatively, at least 40 psi; alternatively, 50 psi. The air motor 15 increases the pressure of the air by at least 10 fold in order to cause the viscous material 3 to flow from the storage container 20. Alternatively, the air motor 15 increases the air pressure by at least a factor of 15 times; alternatively, a factor that is ≥20 times; alternatively, a factor of 60 times or more.

The magnitude of the air pressure arising from the air motor 15 in the pump assembly 14 may be in excess of 2,068 kpa (300 psi); alternatively, greater than 3,447 kpa (500 psi); alternatively, at least 10,342 kpa (1,500 psi); alternatively, 20,648 kpa (3,000 psi) or more; alternatively from about 2,068 kpa (300 psi) to about 41,369 kpa (6,000 psi); alternatively, about 41,369 kpa (6,000 psi). The applied pressure causes the viscous material 3 to be pumped from the storage container 20 into the pipe or tube 21 that is in fluid communication therewith. Subsequently, the viscous material 3 is forced to flow 25 through a secondary pipe or tube 23 to an applicator or other fluid handling equipment for ultimate application onto the surface of a part (not shown).

When desirable, the follower plate 30 after being inserted into the opening 19 of the storage container 20 may be heated so that the viscous material 3 (e.g., a hot melt adhesive, etc.) contained within the storage container 20 becomes liquefied or placed into a condition that allows the material 3 to be pumped from the storage container 20. As more and more of the viscous material 3 is removed from the storage container 20, the follower plate 30 continues to move (m) downward, e.g., be inserted, into the storage container 20 until the follower plate 30$m$ reaches the bottom 23 of the container 20 as shown in FIG. 1 as follower plate 30$m$ (dotted lines).

Once the follow plate 30$m$ reaches the bottom 23 of the container 20 a change-out process is initiated in which the follower plate 30$m$ is raised to its original position 30 as shown in FIG. 1. The empty container is then removed from the stand 11 and a new storage container 30 containing viscous material 3 is placed on the stand 11. Then, the process of forcing viscous material 3 to be removed from the storage container 20 as previously described above and further defined herein is repeated.

Figure 2:
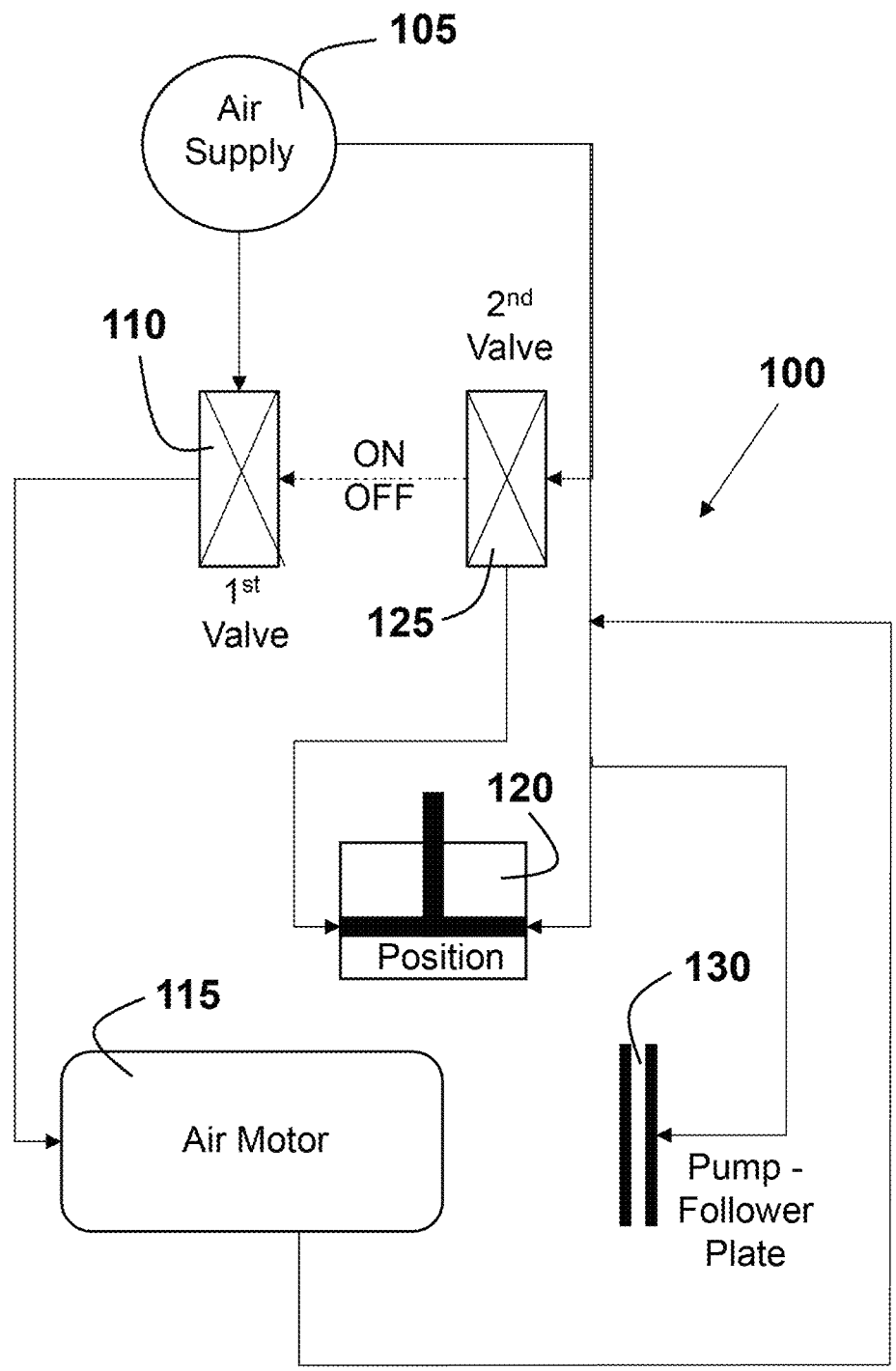
FIG. 2 is a schematic representation of a pneumatic control system for the apparatus of FIG. 1 that includes the safety device according to the teachings of the present disclosure.

Referring now to FIG. 2, the pneumatic control system 100 comprises a first valve 110 configured to reversibly switch between on and off in order to allow or prevent air pressure from flowing from an air supply source 105 (e.g., plant air supply, etc.) to the air motor 115, at least one device configured to measure the position 130 of the follower plate relative to the storage container; and a second valve 125 that is in communication with the first valve 110 and the positioning device 130. The air motor 115 also supplies pressurized air to operate the pump and move the follower plate 120. The second valve 125 is configured to instruct the first valve 110 to prevent air pressure from being supplied from the source 105 to the air motor 115 when the follower plate is outside of the storage container and to instruct the first valve 110 to allow air pressure from the source 105 to be supplied to the air motor 115 when the follower plate is inside of the storage container. The first valve 110 may be a solenoid type valve, while the second valve 125 may be either an air-operated or electric pilot valve. A solenoid valve is an electromechanical device in which the solenoid uses an electric current to generate a magnetic field and thereby operate a mechanism which regulates the opening of fluid flow in the valve.

Figure 3:
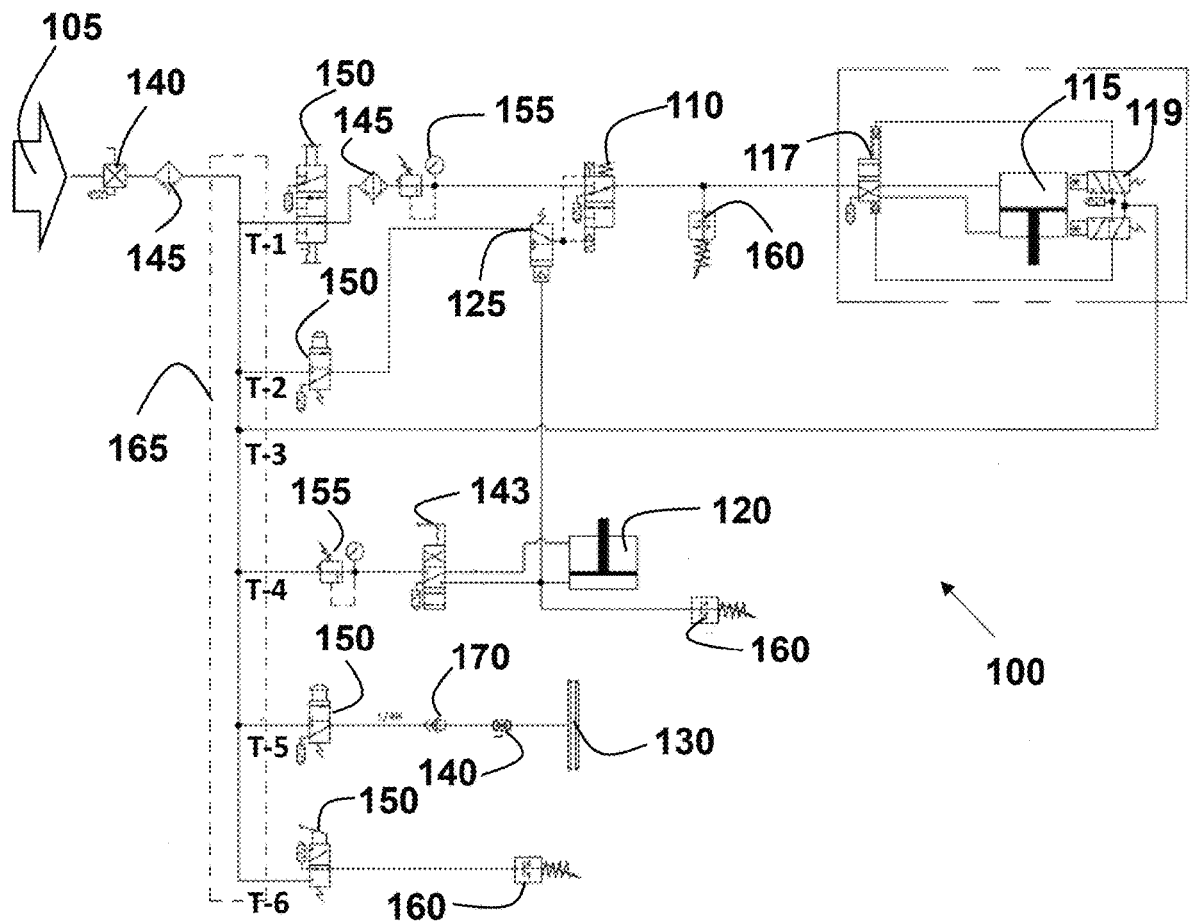
FIG. 3 is a schematic representation of one specific example of a pneumatic control system according to the teachings of the present disclosure.

Referring now to FIG. 3, a specific example of the layout of various components located within a pneumatic control system 100 that incorporates the safety mechanism described above and further defined herein is provided without limitation. Air pressure supplied from an air pressure source 105 (e.g., plant air supply, etc.) may be provided to a multiple connection points 165 within the tubing or pipe (e.g., series of joints, T-1, T-2, . . . T-6, etc.), which allows the air supply to be provided to different portions of the apparatus to which the pneumatic control system 100 interacts. For example, this air pressure 105 (e.g., is supplied through a first valve 110 to an air motor 115 (see pathway T-1 in FIG. 3). Air pressure is also supplied (see pathway T-2) to a pilot valve 125 that is in communication with a positioning device 120 that identifies the position or location of the follower plate 130 to be inside or outside of the storage container and to the first valve 110. The positioning device 120 includes the use of a diverter valve 143 that allows air pressure to move the follower plate up or down. The pilot valve 125 operates the first valve 110 by either closing the valve 110 to prevent air pressure from being supplied to the air motor 115 or opening the valve 110 to allow air pressure to flow to the air motor 115.

The air motor 115 generally includes a valve 117 coupled to a positive pressure pump and another solenoid valve 119 that alternates the air supply in valve 117 such that the air motor efficiently operates in an up and down manner. The air pressure is supplied through the multiple connector 165 (to indicate when the storage container is empty (see T-6). The pneumatic control system 100 may further comprise various other components, including but not limited to various valves, such as ball valves 140, diverter valves 143, and manual push button valves or lockouts 150, as well as filters 145, regulators 155, switches 160, and quick release or disconnections 170.

Figure 4:
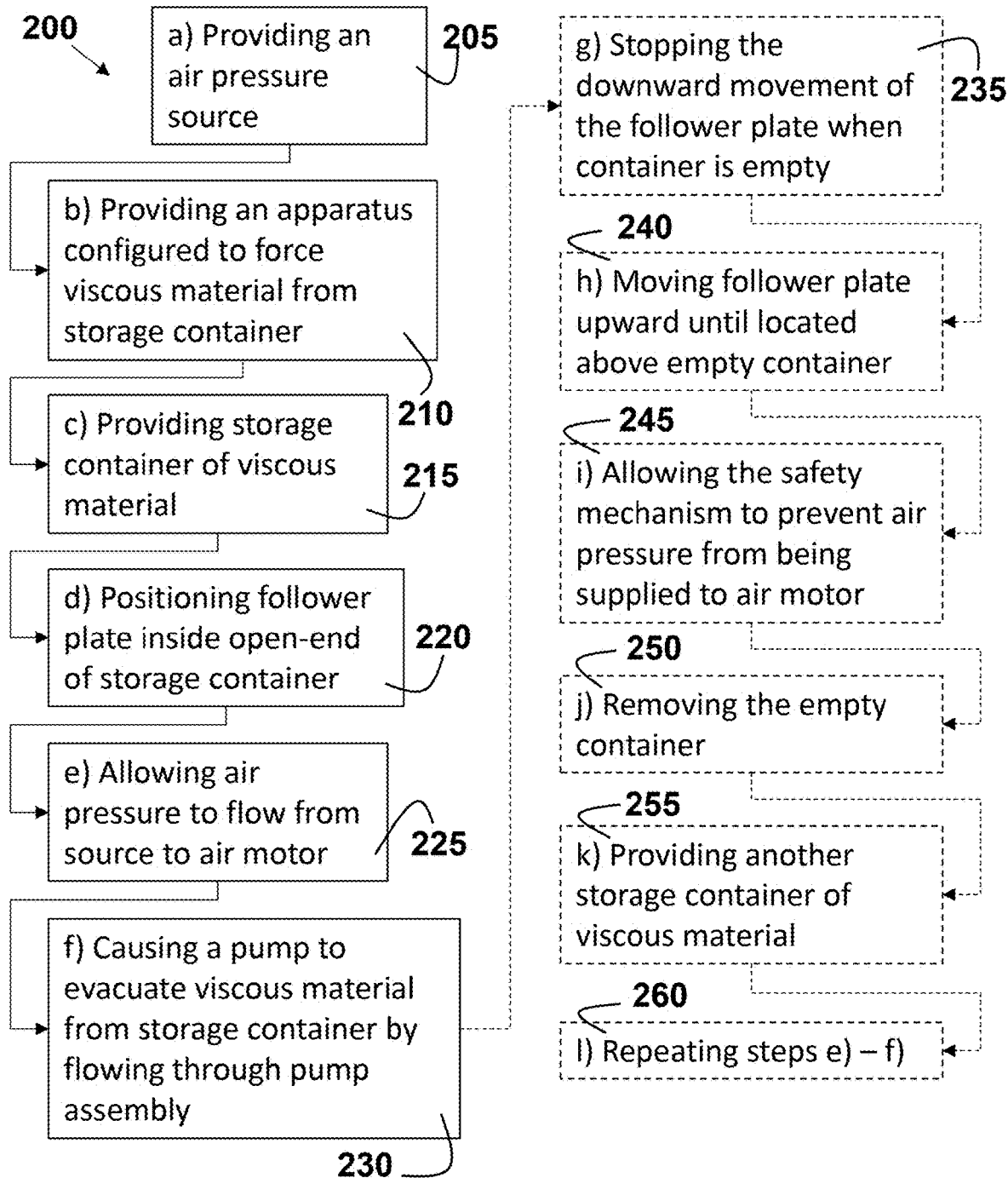
FIG. 4 is a flowchart describing the operation of the drum unloading apparatus of FIG. 1 with the safety device incorporated therein.

According to another aspect of the present disclosure, a method 200 of removing the viscous material from the storage container is provided in FIG. 4. Referring now to FIG. 4, this method 200 generally comprises the steps of:
  a) providing 205 a source of air pressure;
  b) providing 210 an apparatus configured to force the viscous material to flow from the storage container;
  c) providing 215 the storage container of the viscous material;
  d) positioning 220 the follower plate inside the open-end of the storage container;
  e) allowing 225 air pressure to flow from the source to the air motor-driven pump assembly; and
  f) causing 230 a pump to evacuate viscous material from the storage container by flowing through the pump assembly.

The apparatus provided in step b) comprises an air motor-driven pump assembly, a follower plate, a sealing element, a stand, at least one controller, and a safety mechanism as previously described above. The safety mechanism reversibly allows or prevents air pressure from being supplied from the source to the air motor-driven pump assembly depending upon the position of the follower plate;

The method may further comprise the steps of:
  g) stopping 235 the downward movement of the follower plate when the follower plate approaches the bottom of the storage container; the storage container now becoming an empty container;
  h) moving 240 the follower plate in an upward direction until it reaches a position that is above the open-end of the empty container;
  i) allowing 245 the safety mechanism to prevent air pressure from being supplied from the source to the air motor-driven pump assembly;
  j) removing 250 the empty container;

k) providing 255 another storage container of the viscous material; and l) repeating 260 steps d), e), and f) according to claim 14.

For the purpose of this disclosure the terms "about" and "substantially" are used herein with respect to measurable values and ranges due to expected variations known to those skilled in the art (e.g., limitations and variability in measurements).

For the purpose of this disclosure, the terms "at least one" and "one or more of" an element are used interchangeably and may have the same meaning. These terms, which refer to the inclusion of a single element or a plurality of the elements, may also be represented by the suffix "s" at the end of the element. For example, "at least one valve", "one or more valves", and "valves" may be used interchangeably and are intended to have the same meaning.

Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for forcing a viscous material to flow from a storage container, the apparatus comprising:
    a follower plate configured to be inserted into an open-end of the storage container; the follower plate being located in a position that is either outside or inside the storage container;
    a sealing element located around the outer periphery of the follower plate, the sealing element configured to provide a leak-proof seal with the storage container when the follower plate is located inside the storage container;
    a pump assembly that includes a pump, an air motor, and a pipe or tube that is in fluid communication with the follower plate; the air motor being supplied with a source of air pressure;
    a support stand comprising a base, a crossbar; and two or more cylinders with rods inserted therein; the cylinders and rods configured to move the follower plate up or down based on air pressure supplied thereto;
    one or more control systems; and
    a safety mechanism configured to reversibly allow or prevent the air pressure from being supplied to the air motor depending upon the position of the follower plate;
    wherein the safety mechanism comprises:
    a first valve configured to reversibly switch between on and off in order to allow or prevent air pressure from flowing from the source to the air motor;
    at least one device configured to measure the position of the follower plate relative to the storage container; and
    a second valve that is in communication with the first valve and the device; the second valve configured to instruct the first valve to prevent air pressure from being supplied to the air motor when the follower plate is outside of the storage container.

2. The apparatus according to claim 1, wherein the second valve is further configured to instruct the first valve to allow air pressure from the source to be supplied to the air motor when the follower plate is inside of the storage container.

3. The apparatus according to claim 1, wherein the second valve is an air-operated or electric pilot valve.

4. The apparatus according to claim 1, wherein the first valve is a solenoid valve.

5. The apparatus according to claim 1, wherein the air motor increases the air pressure received from the source by at least 10-fold in order to cause the viscous material to flow from the storage container.

6. The apparatus according to claim 1, wherein the viscous material has a viscosity of 30,000 millipascal-seconds (centipoise) or greater.

7. The apparatus according to claim 1, wherein the storage container is a 55-gallon drum, a 5-gallon pail, or a 1-gallon can.

8. The apparatus according to claim 1, wherein the follower plate is configured to include one or more thermal elements capable of heating the material in the storage container.

9. A safety mechanism for use in an apparatus that includes an air motor-driven pump assembly, a follower plate, a sealing element, a stand, and at least one controller, wherein the apparatus forces a viscous material to flow from a storage container, the safety mechanism comprising:
    a first valve configured to reversibly switch between on and off in order to allow or prevent air pressure from flowing from a source to the air motor-driven pump assembly;
    at least one device configured to measure the position of the follower plate relative to the storage container; and
    a second valve that is in communication with the first valve and the device; the second valve configured to instruct the first valve to prevent air pressure from being supplied to the air motor-driven pump assembly when the follower plate is external to the storage container.

10. The safety mechanism according to claim 9, wherein the second valve is further configured to instruct the first valve to allow air pressure from the source to be supplied to the air motor-driven pump assembly when the follower plate is within the storage container.

11. The safety mechanism according to claim 9, wherein the second valve is an air-operated or electric pilot valve.

12. The safety mechanism according to claim 9, wherein the first valve is a solenoid valve.

13. A method of removing a viscous material from a storage container, the method comprising the steps of:
a) providing a source of air pressure;
b) providing an apparatus configured to force the viscous material to flow from the storage container; the apparatus comprising an air motor-driven pump assembly, a follower plate, a sealing element, a stand, at least one controller, and a safety mechanism, wherein the safety mechanism reversibly allows or prevents air pressure from being supplied from the source to the air motor-driven pump assembly depending upon the position of the follower plate, the safety mechanism comprising:
  a first valve configured to reversibly switch between on and off in order to allow or prevent air pressure from flowing from the source to the air motor;
  at least one device configured to measure the position of the follower plate relative to the storage container; and
  a second valve that is in communication with the first valve and the device; the second valve configured to instruct the first valve to prevent air pressure from being supplied to the air motor when the follower plate is outside of the storage container;
c) providing the storage container of the viscous material;
d) positioning the follower plate inside the open-end of the storage container;
e) allowing air pressure to flow from the source to the air motor-driven pump assembly; and
f) causing a pump to evacuate viscous material from the storage container by flowing through the pump assembly.

14. The method according to claim 13, wherein the second valve is further configured to instruct the first valve to allow air pressure from the source to be supplied to the air motor when the follower plate is inside of the storage container.

15. The method according to claim 13, wherein the second valve is an air-operated or electric pilot valve and the first valve is a solenoid valve.

16. The method according to claim 13, wherein the method further comprises:
g) stopping the downward movement of the follower plate when the follower plate approaches the bottom of the storage container; the storage container now becoming an empty container;
h) moving the follower plate in an upward direction until it reaches a position that is above the open-end of the empty container;
i) allowing the safety mechanism to prevent air pressure from being supplied from the source to the air motor-driven pump assembly;
j) removing the empty container;
k) providing another storage container of the viscous material; and
l) repeating steps d), e), and f).

17. The use of the apparatus that includes the safety mechanism according to claim 9.

* * * * *